United States Patent
Won et al.

(10) Patent No.: US 12,062,120 B2
(45) Date of Patent: Aug. 13, 2024

(54) METHOD FOR AUTOMATICALLY ARRANGING AND MATCHING GRAPH ONTO FIGURE, AND COMPUTER-READABLE MEDIUM

(71) Applicant: REXSOFT CO., LTD., Seoul (KR)

(72) Inventors: Sung Ho Won, Seoul (KR); Sung Young Lee, Seoul (KR)

(73) Assignee: REXSOFT CO., LTD., Seoul (KR)

( * ) Notice: Subject to any disclaimer, the term of this patent is extended or adjusted under 35 U.S.C. 154(b) by 0 days.

(21) Appl. No.: 18/270,629

(22) PCT Filed: Dec. 23, 2021

(86) PCT No.: PCT/KR2021/019688
§ 371 (c)(1),
(2) Date: Jun. 30, 2023

(87) PCT Pub. No.: WO2022/145870
PCT Pub. Date: Jul. 7, 2022

(65) Prior Publication Data
US 2023/0394726 A1 Dec. 7, 2023

(30) Foreign Application Priority Data
Dec. 31, 2020 (KR) .................. 10-2020-0189330

(51) Int. Cl.
*G06T 11/20* (2006.01)
*G06F 3/0486* (2013.01)
(52) U.S. Cl.
CPC .......... *G06T 11/206* (2013.01); *G06F 3/0486* (2013.01)

(58) Field of Classification Search
CPC .......................... G06T 11/206; G06F 3/0486
See application file for complete search history.

(56) References Cited

U.S. PATENT DOCUMENTS

| 2006/0082594 A1 | 4/2006 | Vafiadis et al. |
| 2007/0074109 A1* | 3/2007 | Nagahara .............. G06F 40/103 715/269 |

(Continued)

FOREIGN PATENT DOCUMENTS

| JP | H06-131470 A | 5/1994 |
| JP | 2007-149061 A | 6/2007 |

(Continued)

OTHER PUBLICATIONS

Evans McLaughlin, https://blog.minitab.com/en/updating-graphs-patterned-data-tips-tricks-master-minitab "Updating Graphs, Making Patterned Data and More Tips & Tricks to Help You Master Minitab" Sep. 2, 2020.

*Primary Examiner* — Michelle L Sams
(74) *Attorney, Agent, or Firm* — Bridgeway IP Law Group, PLLC; Sang Ho Lee; Hyun Woo Shin

(57) ABSTRACT

A method for automatically arranging and matching a graph onto a figure, and a computer-readable medium, according to one embodiment of the present invention, include the steps of: (a) receiving data to be used for graph generation; (b) generating a graph including first meta information; (c) generating an arrangement layout including second meta information and including at least one arrangement region in which the generated graph may be arranged; and (d) optimally arranging the generated graph in the at least one arrangement region by using the first meta information and the second meta information.

8 Claims, 11 Drawing Sheets

(56) References Cited

U.S. PATENT DOCUMENTS

2007/0097148 A1* 5/2007 Tanaka .................... G06T 11/60
345/619
2014/0078182 A1* 3/2014 Utsunomiya ............ G09G 5/37
345/666

FOREIGN PATENT DOCUMENTS

| JP | 5866446 B2 | 2/2016 |
| KR | 10-2002-0070609 A | 9/2002 |
| KR | 10-2006-0070408 A | 6/2006 |
| KR | 10-2014-0104536 A | 8/2014 |
| KR | 10-2017-0060601 A | 6/2017 |

\* cited by examiner

METHOD FOR AUTOMATICALLY ARRANGING AND MATCHING GRAPH ONTO FIGURE, AND COMPUTER-READABLE MEDIUM

TECHNICAL FIELD

This application claims the benefit of Korean Patent Application No. 10-2020-0189330, filed on Dec. 31, 2020, in the Korean Intellectual Property Office, the disclosure of which is incorporated herein by reference in its entirety.

The present invention relates to a method and computer-readable medium for automatically arranging and matching a graph onto a figure, and more specifically, to a method and computer-readable medium for automatically arranging and matching a graph onto a figure, which are capable of optimally arranging a generated graph in various arrangement regions.

BACKGROUND ART

Recently, many people have been performing tasks involving generating graphs based on data using computerized programs. However, when a graph is generated in an image file format and the like, and the graph needs to be rearranged in arrangement regions of various sizes, there is a problem that the image file is not always optimized to fit geometric information such as an aspect ratio, a size, and the like of the arrangement region.

Japanese Patent Registration No. 5866446 discloses only generating a graph based on input data, without disclosing a method of optimally rearranging generated data for a new arrangement region.

Therefore, there is a need for a method of rearranging a graph such that geometric information, such as a size, and attribute information of a marker, such as a title and a legend, of a graph are optimized for geometric information and attribute information of an arrangement region.

DISCLOSURE

Technical Problem

The present invention is to resolve the above described issue, and specifically, aims to provide a method and computer-readable medium for automatically arranging and matching a graph onto a figure, which are capable of rearranging a generated graph to be optimized for an arrangement region.

The technical objectives of the present invention are not limited to the above, and other objectives may become apparent to those of ordinary skill in the art based on the following descriptions.

Technical Solution

One aspect of the present invention provides a method of automatically arranging and matching a graph onto a figure, the method comprising the steps of: (a) receiving data used for graph generation; (b) generating a graph including first meta information; (c) generating an arrangement layout including second meta information and at least one arrangement region in which the generated graph is arrangeable; and (d) optimally arranging the generated graph in the at least one arrangement region using the first meta information and the second meta information.

The first meta information may include geometric information of the graph and attribute information of a marker of the graph, and the second meta information may include geometric information of the at least one arrangement region and attribute information of a marker of the arrangement region.

The geometric information of the first meta information and the second meta information may include information related to at least one of an aspect ratio, a horizontal size, a vertical size, and a unit of size, and the attribute information of the first meta information and the second meta information may include information related to at least one of a font, a font size, a unit of size, a color, and a type of a shape.

The step (d) may include moving the generated graph to the at least one arrangement region in a drag and drop method.

The step (d) may include: extracting the first meta information and the second meta information; processing the first meta information to generate third meta information such that the generated graph is optimized for the at least one arrangement region based on the second meta information; and re-rendering the generated graph based on the third meta information.

The method may further include a step (e) of processing the arrangement layout, in which the generated graph is optimally arranged in the at least one arrangement region, as one figure.

One aspect of the present invention provides a computer readable medium in which a computer program is stored, the computer program for executing the steps of: (a) receiving data used for graph generation; (b) generating a graph including first meta information; (c) generating an arrangement layout including second meta information and at least one arrangement region in which the generated graph is arrangeable; and (d) optimally arranging the generated graph in the at least one arrangement region using the first meta information and the second meta information.

The first meta information may include geometric information of the graph and attribute information of a marker of the graph, and the second meta information may include geometric information of the at least one arrangement region and attribute information of a marker of the arrangement region.

The step (d) may include: extracting the first meta information and the second meta information; processing the first meta information to generate third meta information such that the generated graph is optimized for the at least one arrangement region based on the second meta information; and re-rendering the generated graph based on the third meta information.

The computer readable medium may further include a step (e) of processing the arrangement layout, in which the generated graph is optimally arranged in the at least one arrangement region, as one figure.

Advantageous Effects

A method and computer-readable medium for automatically arranging and matching a graph onto a figure according to an embodiment of the present invention can allow a generated graph to be easily rearranged optimally for an arrangement region.

The effects according to the present invention are not limited by the contents exemplified above, and various other effects are included in the present specification.

BEST MODES OF THE DISCLOSURE

Figure 1:
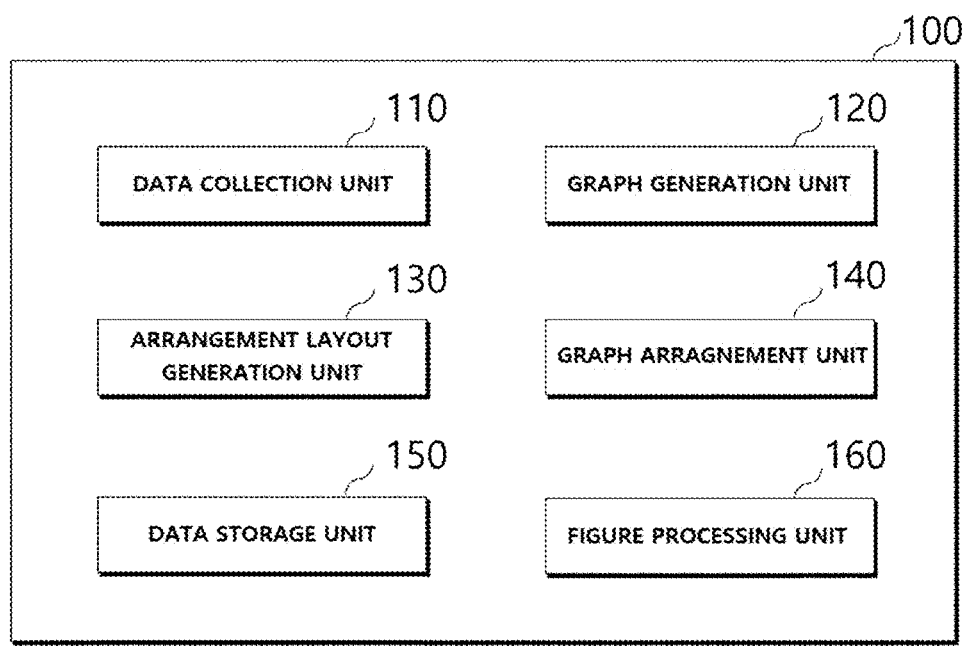
FIG. 1 is a schematic block diagram illustrating a computer program for automatic arrangement and matching in a diagram according to an embodiment of the present invention.

Hereinafter, advantages, features, and ways to achieve them will become readily apparent with reference to descriptions of the following detailed embodiments when considered in conjunction with the accompanying drawings. However, the scope of the present invention is not limited to such embodiments, and the present invention may be realized in various forms.

The embodiments to be described below are only embodiments provided to complete the disclosure of the present invention and help those skilled in the art to completely understand the scope of the present invention, and the present invention is defined only by the scope of the appended claims. The same reference numerals are used to designate the same elements through the specification.

Hereinafter, a method and computer-readable medium for automatic arrangement and matching in a figure according to embodiments of the present invention will be described with reference to the accompanying drawings.

FIG. 1 is a schematic block diagram illustrating a computer program for automatic arrangement and matching in a diagram according to an embodiment of the present invention.

Referring to FIG. 1, a computer program 100 for automatic arrangement and matching according to the embodiment of the present invention includes a data collection unit 110, a graph generation unit 120, an arrangement layout generation unit 130, a graph arrangement unit 140, a data storage unit 150, and a figure processing unit 160.

The computer program 100 according to the embodiment of the present invention may be an independent program or a program that may be used in conjunction with other programs. For example, the computer program 100 may be a program that may be installed and operated in an existing program such as Excel in a plug-in method.

Hereinafter, an example of a case in which the computer program 100 according to the present invention is installed and operated in a program such as Excel in a plug-in method will be described. However, this is only an example and it is not limited thereto.

The data collection unit 110 serves to collect data used for graph generation.

In response to the computer program 100 being installed and operated in Excel in a plug-in method, the data collection unit 110 may collect Excel data. In this case, the Excel data may be, for example, statistical data composed of information of data in a plurality of columns and rows.

The graph generation unit 120 serves to generate a graph based on raw data collected by the data collection unit 110.

In this case, the graph generation unit 120 may generate a graph including all information constituting the graph to be generated, for example, meta information including a composition of the graph, geometric information of the graph, and attribute information of a marker of the graph.

Hereinafter, for the sake of convenience, the meta information of the graph will be referred to as "first meta information."

To this end, the graph generation unit 120 may provide a user with a user interface through which the user may set meta information such as composition, geometric information, and attribute information of a graph to be generated.

The composition of the graph includes the entire set of elements constituting the graph, such as a line, a dot, a title, a legend, a data element, a background, a text string, and the like as well as complex elements having a plurality of subgraphs.

The geometric information may include information such as an aspect ratio of the graph, horizontal and vertical sizes of the graph, a rendering priority, a unit of size, and the like.

The attribute information may include textual elements and non-textual elements, and the textual elements may include information related to at least one of a font, a font size, a unit of size, and a color, and may also include visual attributes assigned to text. The visual attributes may be, for example, information such as fill, outline, shadow, and 3D transformation.

The non-textual elements include information related to at least one of a type, a size, a unit of size, and a color of a shape, and may include additionally assigned visual attributes. The visual attributes may be, for example, information such as fill, outline, shadow, and 3D transformation.

The setting of meta information of a user through the user interface provided by the graph generation unit 120 will be described below with reference to FIGS. 4 to 7.

The arrangement layout generation unit 130 serves to generate an arrangement layout including at least one arrangement region in which the generated graph may be arranged.

In this case, the arrangement layout may include one arrangement region or a plurality of arrangement regions, and each of the arrangement regions includes meta information including geometric information, attribute information, and geometric information about one or more arrangement regions.

Hereinafter, for the sake of convenience, the meta information of the arrangement region will be referred to as "second meta information."

The geometric information and the attribute information of the second meta information are substantially the same as the geometric information and the attribute information of the first meta information.

The geometric information about the one or more arrangement regions of the second meta information includes the definition of an absolute or relative coordinate system for the one or more arrangement regions and geometric attributes of each of the arrangement regions based on the coordinate system.

For example, the geometric attributes include information related to at least one of coordinates, a transformation matrix, a relative origin, a rendering priority, a size, and a unit of size of an arrangement region.

The arrangement layout generation unit 130 may provide a user interface through which the user may set the form of the arrangement layout, the second meta information of each arrangement region, and the like.

The graph arrangement unit 140 serves to, when a user issues a command for arranging a generated graph in a specific arrangement region of an arrangement layout, optimally arrange the graph in the selected arrangement region.

In this case, the user's command for arranging the graph in the specific arrangement region may be to select and move a generated graph with a mouse or the like in a drag and drop method.

The graph arrangement unit 140 may re-render the graph optimally for the arrangement region using the first meta information of the graph and the second meta information of the arrangement region.

Figure 2:
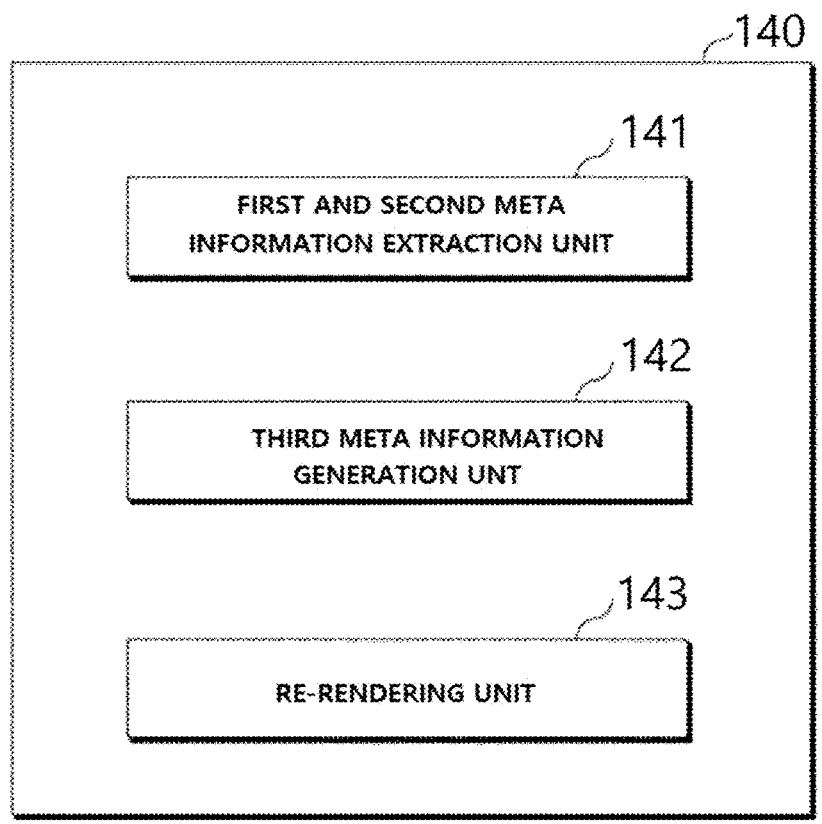
FIG. 2 is a schematic block diagram illustrating a graph arrangement unit shown in FIG. 1.

Referring to FIG. 2, the graph arrangement unit 140 may include a first and second meta information extraction unit 141, a third meta information generation unit 142, and a re-rendering unit 143.

The first and second meta information extraction unit 141 serves to extract first meta information of a graph and second meta information of an arrangement region.

As described above, the first meta information and the second meta information include geometric information and attribute information.

The third meta information generation unit 142 serves to process the first meta information to generate third meta information such that the generated graph is optimized for at least one arrangement region based on the second meta information.

For example, the third meta information generation unit 142 may, based on comparing the first meta information of the graph with the second meta information and determining that the first meta information is changeable, replace the first meta information with the second meta information, thereby generating the third meta information.

That is, the third meta information generation unit 142 may prioritize second meta information, and when there is an item present in first meta information that is not defined in second meta information, reflect the first meta information of the corresponding item to generate third meta information.

The re-rendering unit 143 serves to re-render the generated graph based on the generated third meta information.

That is, in the above example, when third meta information is generated according to a preset algorithm or a criterion set by a user, the original graph may be regenerated according to the third meta information.

The data storage unit 150 serves to collect information collected or generated by the data collection unit 110, the graph generation unit 120, the arrangement layout generation unit 130, the graph arrangement unit 140, and the figure processing unit 160, and store the collected information.

The figure processing unit 160 serves to process an arrangement layout, in which a generated graph is optimally arranged in at least one arrangement region, as one figure.

For example, when three layout regions are formed in an arrangement layout and respective graphs are optimally arranged in the three layout regions, the figure processing unit 160 may convert all three graphs arranged in the layout regions into one figure file.

Figure 3:
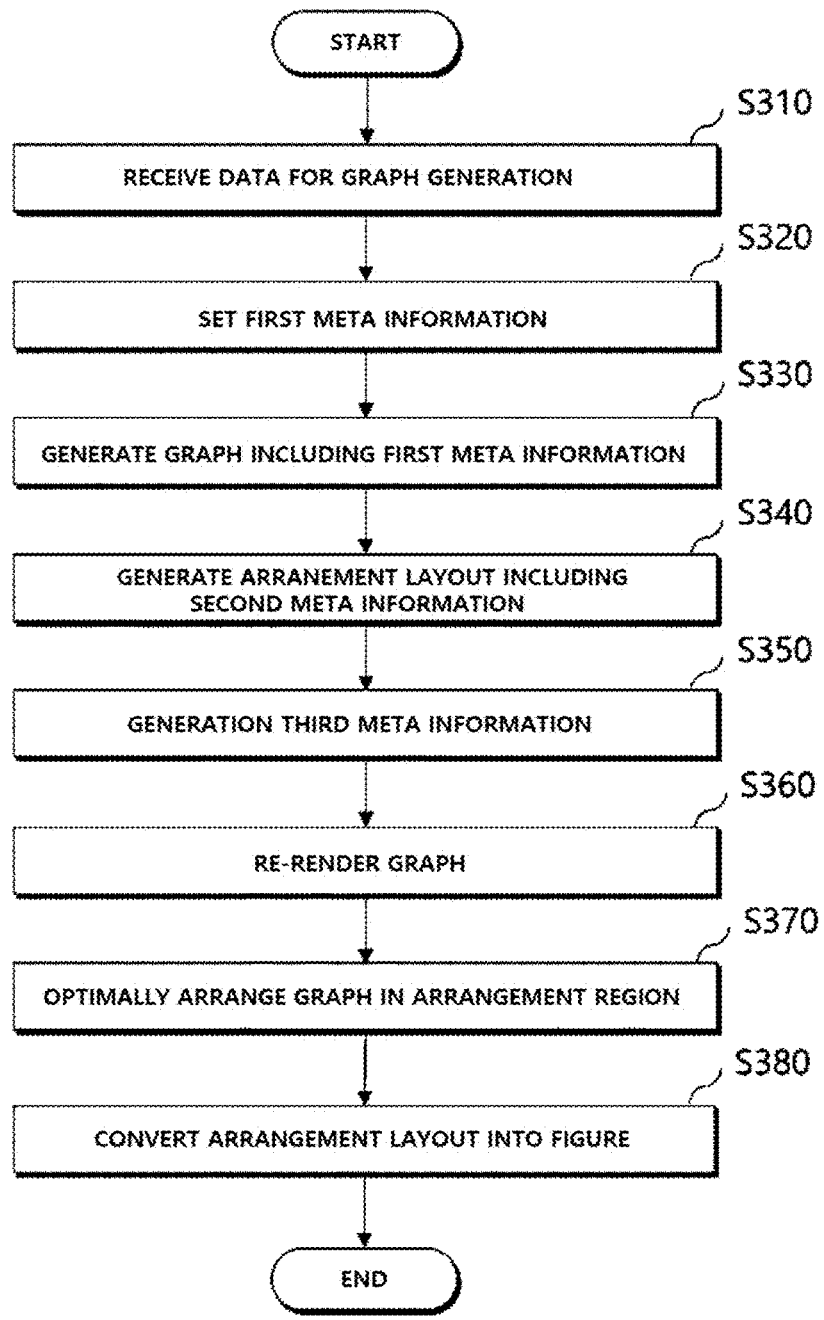
FIG. 3 is a schematic block diagram for describing a method of automatically arrangement and matching in a diagram according to an embodiment of the present invention.

FIG. 3 is a schematic block diagram for describing a method of automatically arranging and matching in a diagram according to an embodiment of the present invention.

A method of automatic arranging and matching in a figure using the computer program 100 including the above configuration will be described below with reference to FIG. 3.

The data collection unit 110 of the computer program 100 receives data for graph generation (S310). In this case, the data may be statistical data written in an Excel format as described above.

The graph generation unit 120 provides a user interface through which first meta information of a graph to be generated is set by a user (S320).

In this case, the first meta information may include geometric information and attribute information of the graph to be generated.

The graph generation unit 120, in response to the first meta information being set by the user, generates a graph including the first meta information (S330).

The arrangement layout generation unit 130 generates an arrangement layout including second meta information (S340).

In detail, the arrangement layout generation unit 130 may provide a user with a user interface through which second meta information including the form of an arrangement layout and geometric information or attribute information of each arrangement region is set.

The graph arrangement unit 140 generates third meta information using the first meta information of the graph and the second meta information of the arrangement layout (S350), and re-renders the original graph based on the generated third meta information (S360).

The graph arrangement unit 140, in response to the re-rendered graph being generated, arranges the re-rendered graph in the arrangement region selected by the user (S370).

The figure processing unit 160 converts the entire arrangement layout including the optimally arranged graph into one figure (S380).

The method and computer-readable medium for automatically arranging and matching a graph onto a figure according to the embodiment of the present invention is implemented to, when a user selects a desired arrangement layout and moves a generated graph to each arrangement region included in the arrangement layout, automatically re-render the original graph based on third meta information that is generated for the original graph to be optimized for the arrangement region, thereby allowing the graph to be easily arranged in a form desired by the user without distortion.

A method of automatically arranging and matching a graph onto a figure according to an embodiment of the present invention will be described with reference to exemplary drawings of FIGS. 4 to 11.

Figure 4:
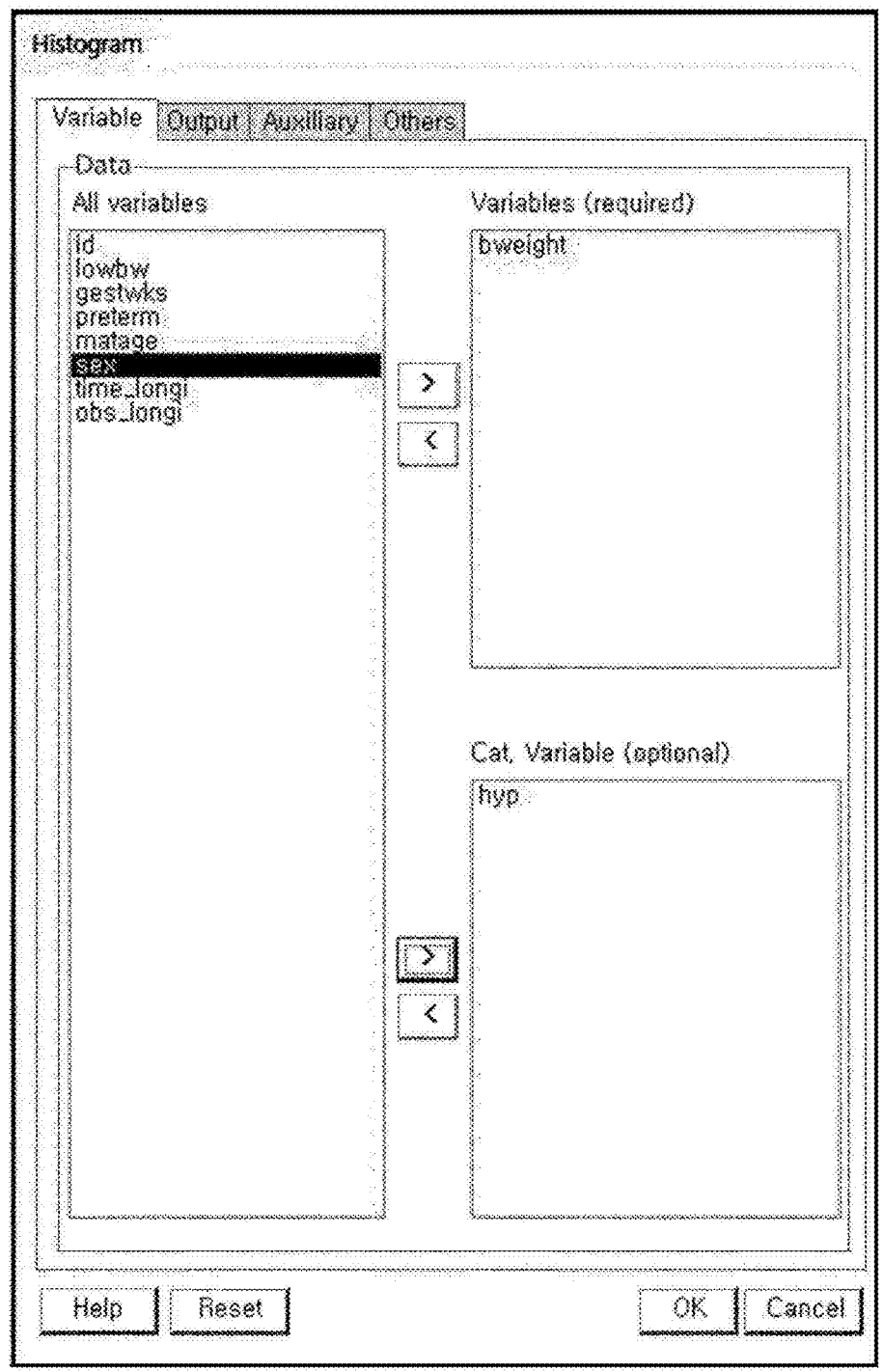
FIG. 4 is a diagram illustrating a screen for setting variables when the computer program shown in FIG. 1 generates a graph.

FIG. 4 is a diagram illustrating a screen for setting variables when the computer program shown in FIG. 1 generates a graph.

In FIG. 4, a screen for selecting data variables to be selected when generating a histogram type graph is illustrated. In FIG. 4, "sex" is selected as an overall variable, "bweight" is selected as a variable, and "hyp" is selected as a group variable.

Figure 5:
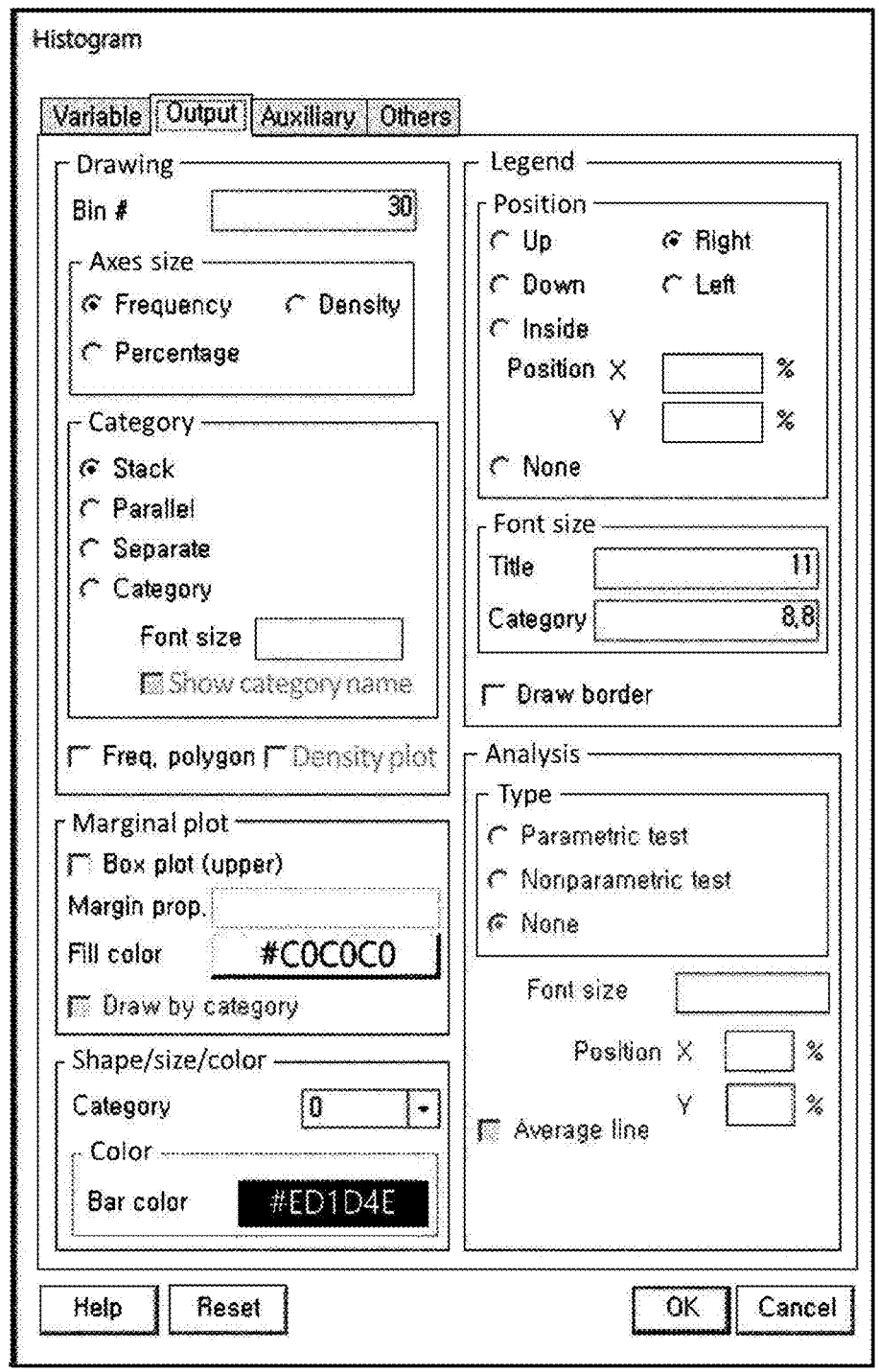
FIG. 5 is a diagram illustrating a screen for setting output options when the computer program shown in FIG. 1 generates a graph.

FIG. 5 is a diagram illustrating a screen for setting output options when the computer program shown in FIG. 1 generates a graph.

In FIG. 5, a screen for selecting an axis size adjustment, a grouping criterion, a bar color, a legend position, a legend font size, and the like as output options is illustrated.

Figure 6:
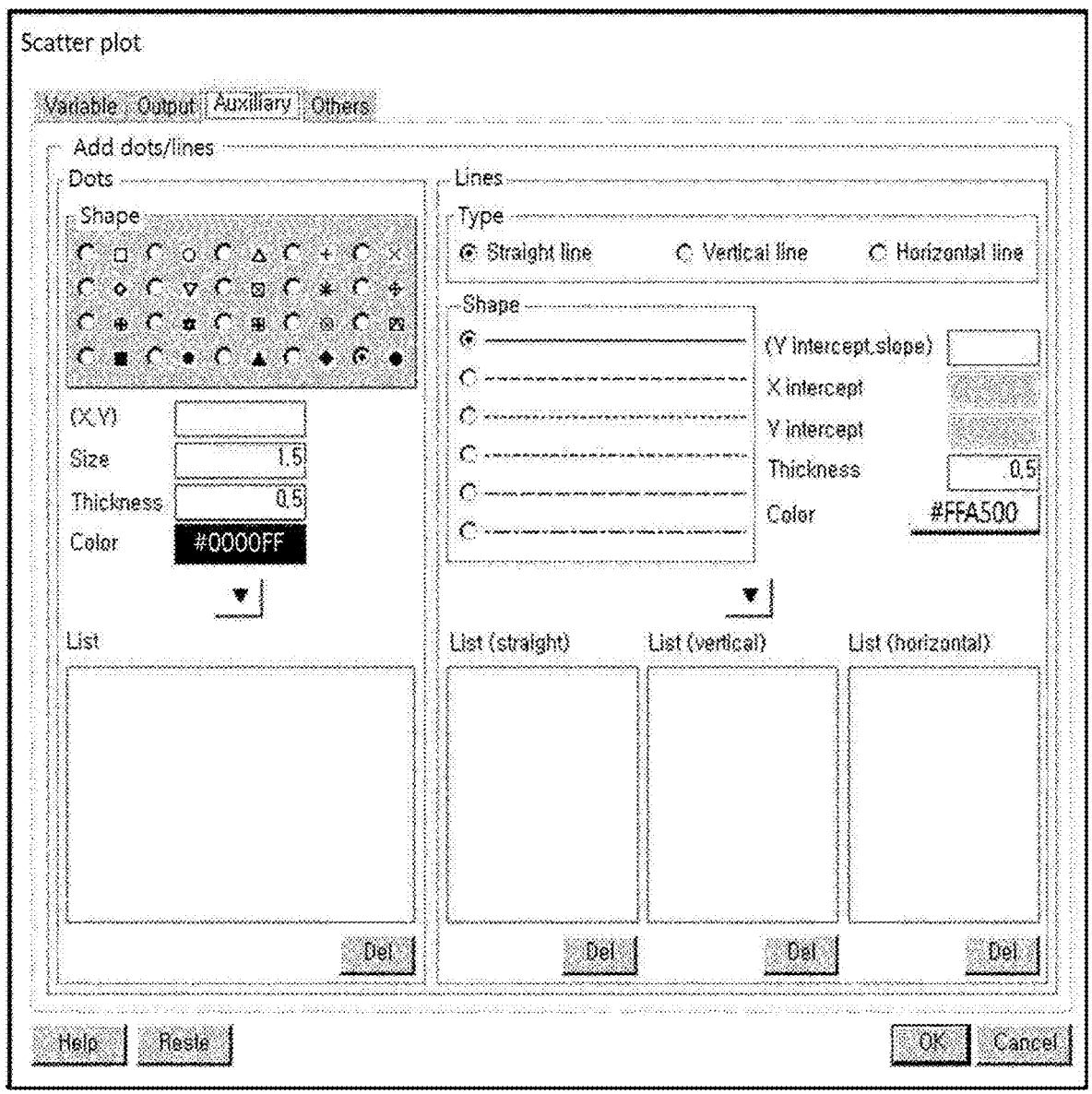
FIG. 6 is a diagram illustrating a screen for setting an auxiliary plot when the computer program shown in FIG. 1 generates a graph.

FIG. 6 is a diagram illustrating a screen for setting an auxiliary plot when the computer program shown in FIG. 1 generates a graph.

In FIG. 6, a screen for selecting a dot shape, a dot size, a dot thickness, a dot color, a line type, a line shape, a line thickness, a line color, and the like of an auxiliary plot is illustrated.

Figure 7:
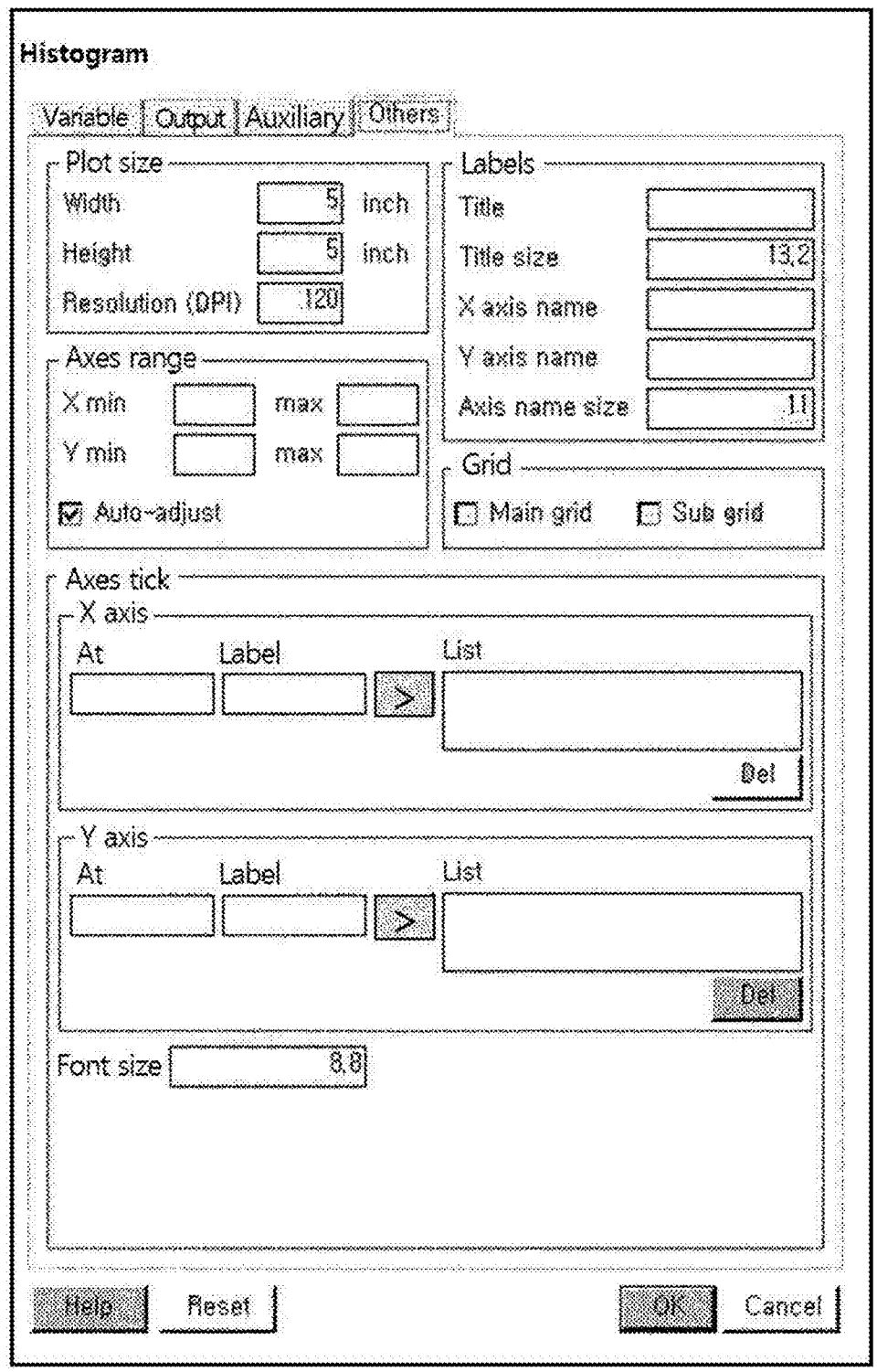
FIG. 7 is a diagram illustrating a screen for setting miscellaneous options when the computer program of FIG. 1 generates a graph.

FIG. 7 is a diagram illustrating a screen for setting miscellaneous options when the computer program of FIG. 1 generates a graph.

In FIG. 7, a screen for selecting a plot size, an axis range, an axis scale, a plot label, a grid, and the like is illustrated.

In FIG. 7, for the plot size, a horizontal size of 5 inches, a vertical size of 5 inches, and a resolution of 120 dpi are selected, and the information serves as the geometric information of the graph, and for the plot label, a title size of 13.2 and a label size of 11 are selected, and the information serves as the attribute information of the graph.

Each selection item in FIGS. 5 and 6 may also be included in geometric information or attribute information according to the nature.

Figure 8:
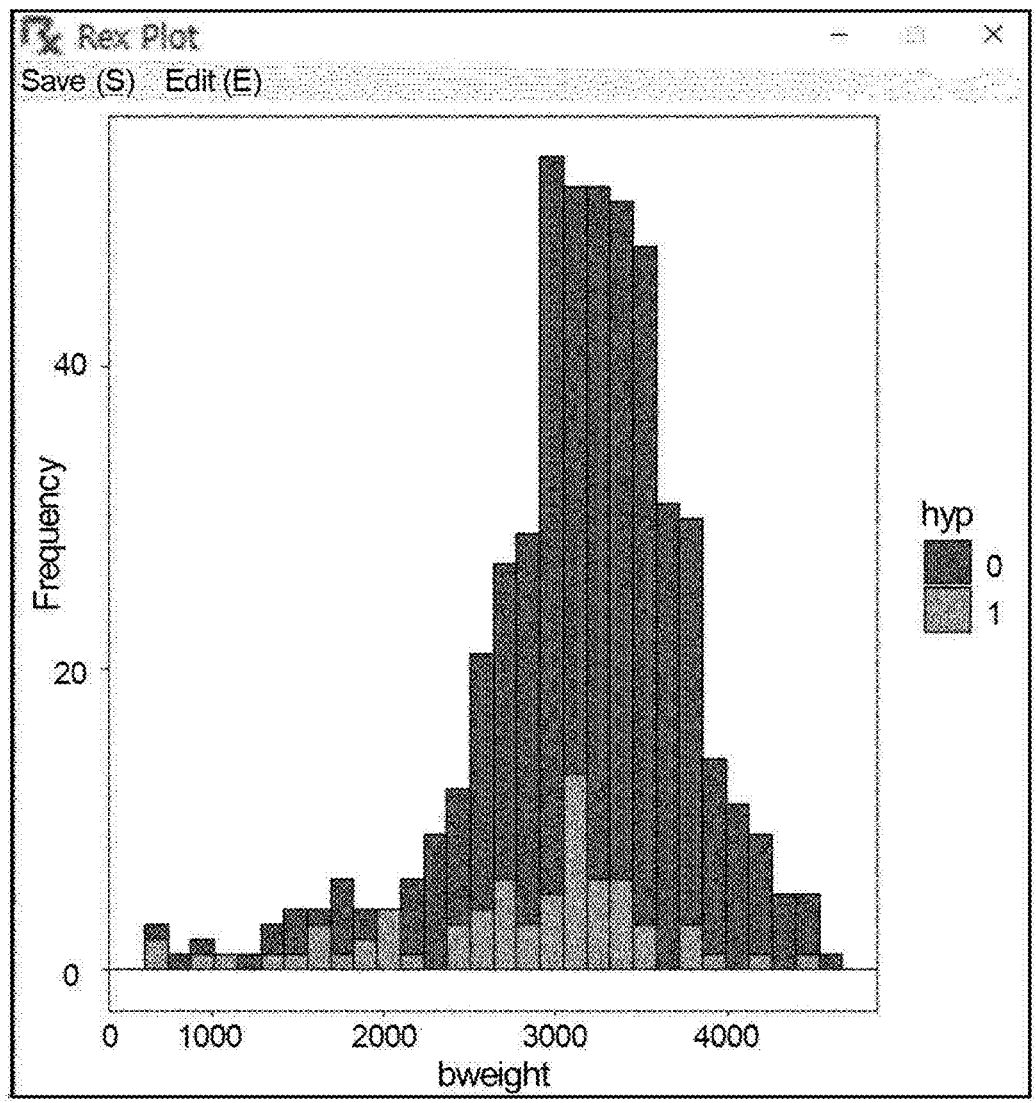
FIG. 8 is an example of a graph generated by the computer program shown in FIG. 1.

FIG. 8 is an example of a graph generated by the computer program shown in FIG. 1.

The graph is illustrated with left and right sizes of 5 inches and an aspect ratio of 1:1 as set in FIG. 7, and the legend display is shown on the right side of the graph.

Figure 9:
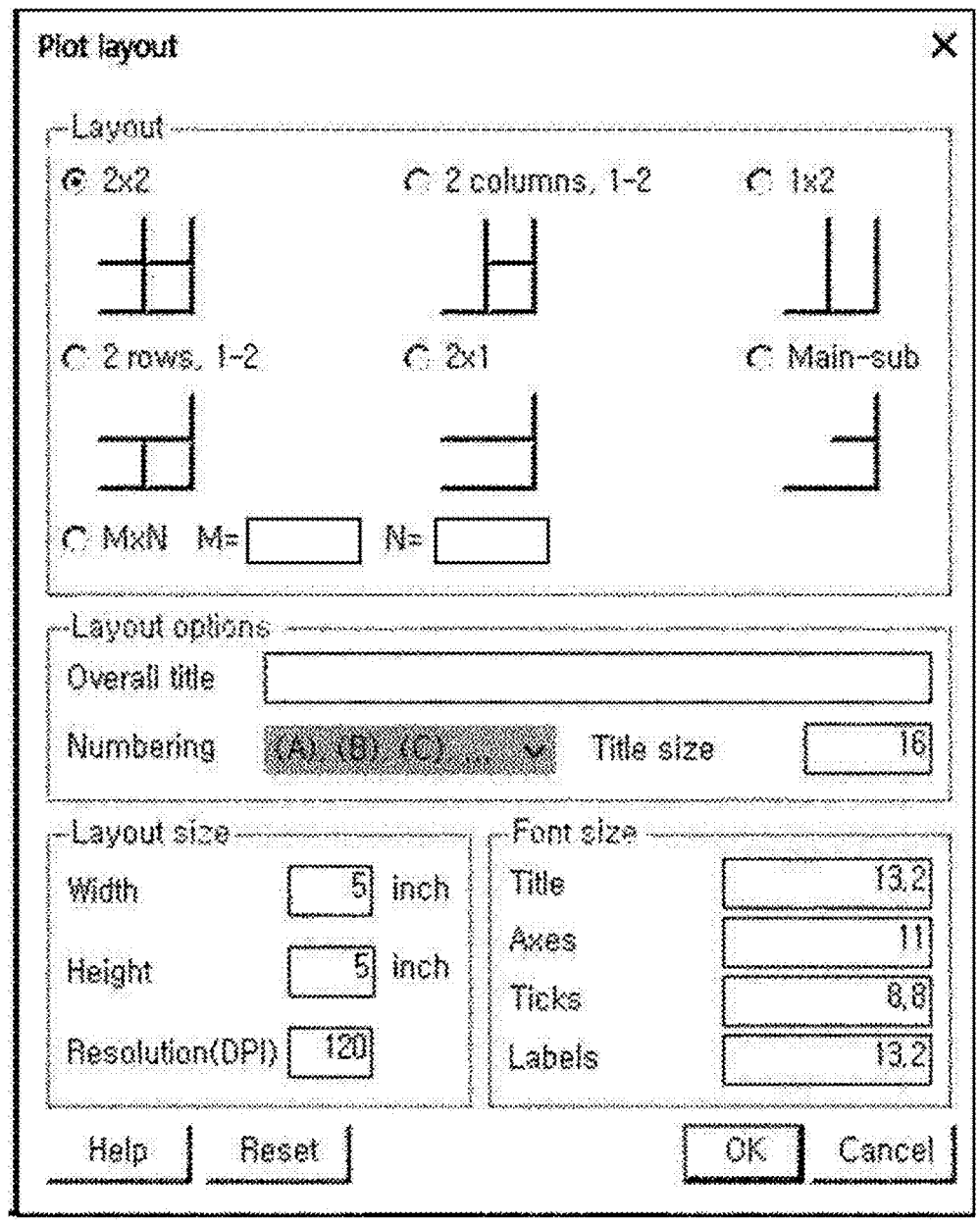
FIG. 9 is a diagram illustrating a screen for setting an arrangement region represented by the computer program shown in FIG. 1.

FIG. 9 is a diagram illustrating a screen for setting an arrangement region represented by the computer program shown in FIG. 1.

Using a selection screen shown in FIG. 9, the user may select a desired layout type, set content and a size of a title of a plot, and set a plot size, a font size and the like.

In FIG. 9, the plot size and the font size may be the size of the entire layout or the size of a specific arrangement region included in the layout.

Figure 10:
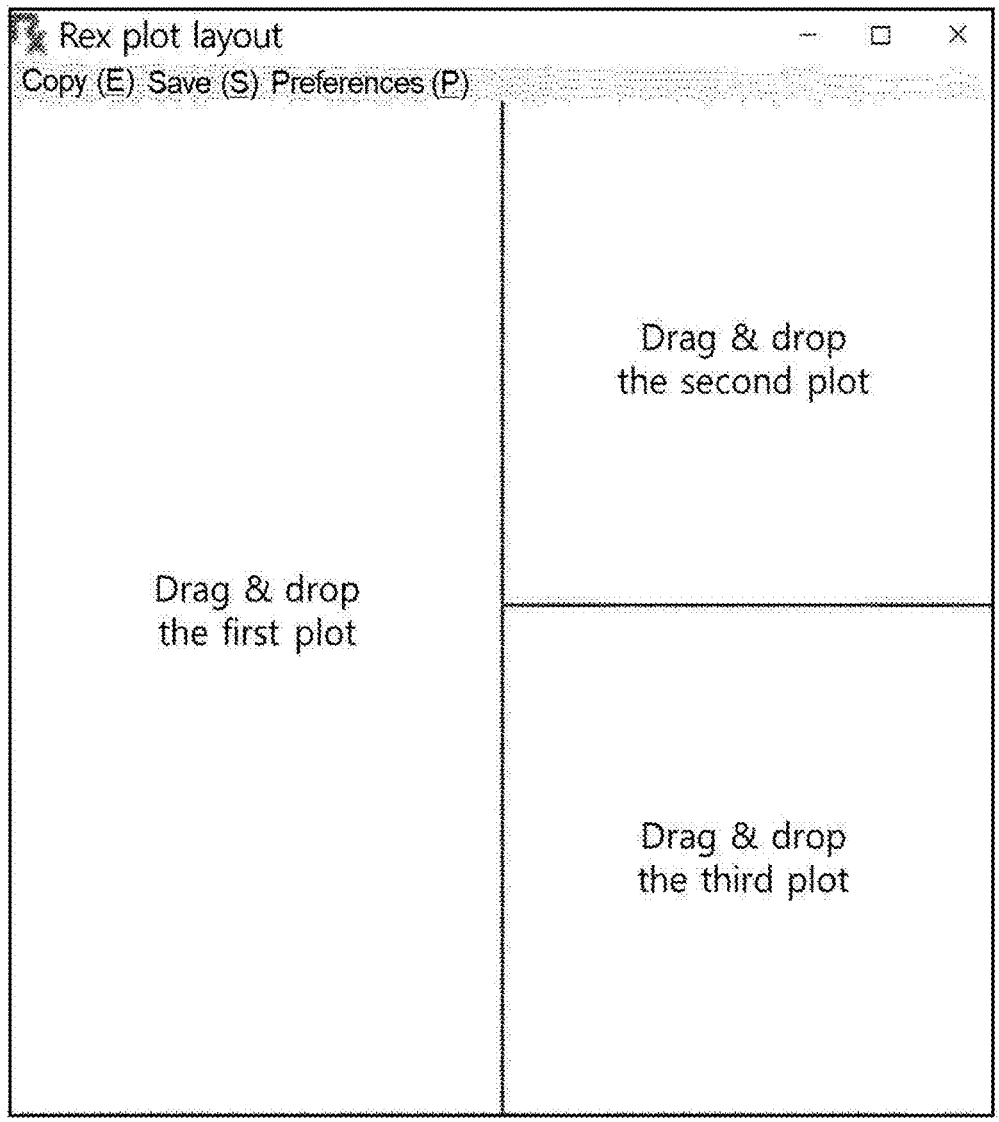
FIG. 10 is a diagram illustrating an arrangement region layout generated after the setting of the arrangement region in FIG. 9.

FIG. 10 is a diagram illustrating an arrangement region layout generated after the setting of the arrangement region in FIG. 9.

In FIG. 10, an arrangement region layout obtained when "two columns, 1-2" is selected as the layout type in FIG. 9 is illustrated.

Figure 11:
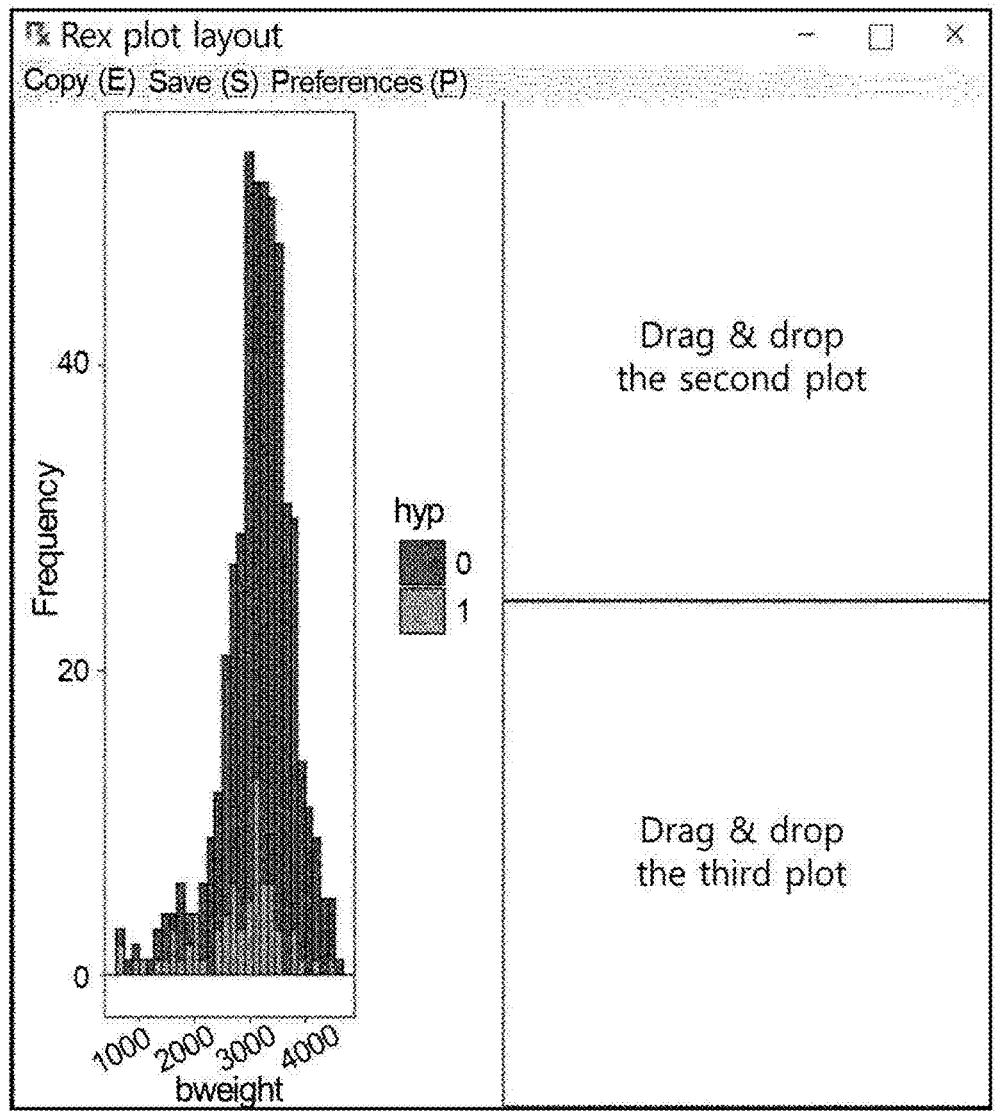
FIG. 11 is a diagram illustrating a figure in which the graph of FIG. 8 is rearranged in the arrangement region layout shown in FIG. 10.

FIG. 11 is a diagram illustrating a figure in which the graph of FIG. 8 is rearranged in the arrangement region layout shown in FIG. 10.

It can be seen that the original graph of FIG. 8 has an aspect ratio of 1:1 while the horizontal and vertical sizes of the graph are adjusted according to the aspect ratio of the arrangement region.

In addition, the font size of the legend display is also displayed with modification according to the attribute information of the arrangement region layout.

When another graph whose aspect ratio is not 1:1 is moved to the remaining rectangular region, a graph re-rendered according to the aspect ratio of 1:1 may be generated and arranged.

Although the geometric information and the attribute information of the original graph may be changed to prioritize the geometric information and the attribute information of the arrangement region layout shown in FIG. 11, it may be set differently.

For example, when the screen for setting the arrangement region layout shown in FIG. 9 has an item "maintain the original aspect ratio," and the user selects the corresponding item, the size of the original image may be adjusted to fit the horizontal and vertical sizes of the arrangement region, but the original proportions may be maintained.

That is, the first meta information of the graph and the second meta information of the arrangement region layout may be set, and the original graph may be optimally arranged in the arrangement region in various forms according to a preset algorithm or a condition selected by the user.

For example, the original graph may be selectively modified such that the size of the original graph is enlarged or reduced to fit the size of the arrangement region while maintaining the original aspect ratio, or the horizontal and vertical sizes of the original graph may be modified with the aspect ratio of the arrangement region prioritized regardless of the original aspect ratio, and apart from the geometric size of the graph, the attribute information, such as the font size of the legend and the graph title included in the graph, may give priority to the meta information of the arrangement region layout.

When using this method, the size of the original graph may be enlarged or reduced or the horizontal and vertical sizes of the original graph may be modified to fit the size of the arrangement region, and the font size of the graph title and the legend may be modified to an appropriate size for readability.

That is, according to the related art, there is a problem that when the size of the graph image file is adjusted, the font size of the title or the legend is excessively increased or decreased, and when the horizontal or vertical size of the graph image file is adjusted, the font size of the title or the legend is distorted. However, with the method according to the present invention, the graph may be optimized to fit the size of the arrangement region, and the font type and the font size of the titles and the legend included in the graph may also maintain an optimized size without distortion.

In addition, according to the present invention, for a drawing, such as a dot plot, in which a graph region does not include entire data depending on the aspect ratio, the aspect ratio may be changed post-hoc through aspect ratio conversion, allowing the drawing to be naturally transformed and displayed.

In addition, when there are a plurality of drawings having different first meta information, the plurality of drawings may be converted into a drawing having a unified format based on second meta information, thereby allowing a unified and standardized drawing to be output.

In addition, when different types of plots, such as sub-drawings (subgraphs), are present on one drawing while sharing non-textual elements, such as an axis, a legend, and data, they may be abstracted as first meta information such that a converted drawing may be obtained without side effects that may occur in the conversion process of the original drawing, such as deformation or dropout of shared elements between drawings.

In addition, since the present invention may consider a three-dimensional element in a geometric element, information that may be lost depending on geometric elements during initial rendering in a drawing of original data (e.g., points that overlap due to gathering in a specific region) may be abstracted as first meta information and data and stored, and may be re-rendered, thereby realizing free post-processing of a drawing.

It will be apparent to those skilled in the art to which the present invention belongs that the present invention may be embodied in other specific forms without changing the technical sprit or essential features thereof. It should therefore be apparent that the above-described embodiments are illustrative in all aspects and not restrictive. The scope of the present invention is defined by the appended claims rather than by the foregoing description, and all changes or modifications derived from the meaning and scope of the claims and the equivalents thereof should be interpreted as being included in the scope of the present invention.

The invention claimed is:

1. A method of automatically arranging and matching a graph onto a figure performed by a computer processor, the method comprising:
  receiving data used for graph generation;
  generating a graph including first meta information;
  generating an arrangement layout including second meta information and a plurality of arrangement regions in which the graph is arrangeable; and
  optimally arranging the graph in a selected arrangement region among the plurality of arrangement regions using the first meta information and the second meta information,
  wherein the first meta information includes geometric information of the graph and attribute information of the graph,
  wherein the second meta information includes geometric information of the plurality of arrangement regions and attribute information of the selected arrangement region,
  wherein the optimally arranging the graph in the selected arrangement region comprises:
    processing the first meta information by replacing the first meta information with the second meta information to generate third meta information to optimize the graph for the selected arrangement region; and
    re-rendering the graph based on the third meta information, and
  wherein the attribute information of the first meta information and the second meta information include information related to at least one of a font, a font size, a unit of size, a color of a shape, a size of a shape, a unit of size of a shape, and a type of a shape.

2. The method of claim 1, wherein the geometric information of the first meta information and the second meta information includes information related to at least one of an aspect ratio, a horizontal size, a vertical size, and a unit of size.

3. The method of claim 1, wherein the optimally arranging the graph in the selected arrangement region further comprises moving the graph to at least one of the plurality of arrangement regions in a drag and drop method.

4. The method of claim 1, further comprising a step (e) of processing the arrangement layout, in which the graph is optimally arranged in the plurality of arrangement regions, as one figure.

5. The method of claim 1, wherein the attribution information includes attribution information of a marker, and the marker is at least one of a title or a legend.

6. A non-transitory computer readable medium in which a computer program is stored, wherein when executed by a computer processor, the computer processor implements a method comprising:
  receiving data used for graph generation;
  generating a graph including first meta information;
  generating an arrangement layout including second meta information and a plurality of arrangement regions in which the graph is arrangeable; and
  optimally arranging the graph in a selected arrangement region among the plurality of arrangement regions using the first meta information and the second meta information,
  wherein the first meta information includes geometric information of the graph and attribute information of the graph,
  wherein the second meta information includes geometric information of the plurality of arrangement regions and attribute information of the selected arrangement region
  wherein the optimally arranging the graph in the selected arrangement region comprises:
    processing the first meta information by replacing the first meta information with the second meta information to generate third meta information to optimize the graph for the selected arrangement region; and
    re-rendering the graph based on the third meta information, and
  wherein the attribute information of the first meta information and the second meta information include information related to at least one of a font, a font size, a unit of size, a color of a shape, a size of a shape, a unit of size of a shape, and a type of a shape.

7. The non-transitory computer readable medium of claim 6, further comprising processing the arrangement layout, in which the graph is optimally arranged in the plurality of arrangement regions, as one figure.

8. The non-transitory computer readable medium of claim 6, wherein the attribution information includes attribution information of a marker, and the marker is at least one of a title or a legend.

* * * * *